Oct. 10, 1939.　　　　J. L. McGRATH　　　　2,175,944
AMUSEMENT DEVICE
Filed Dec. 31, 1936
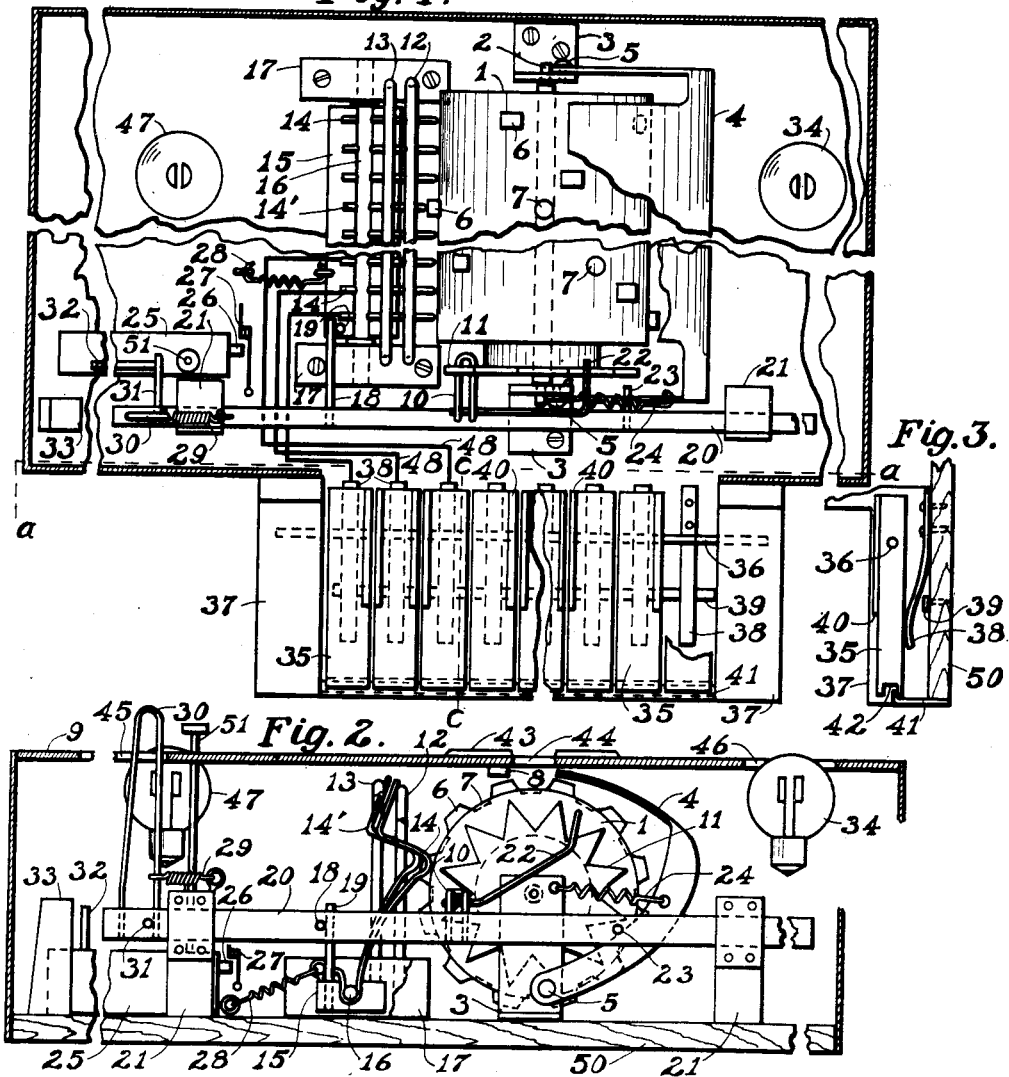
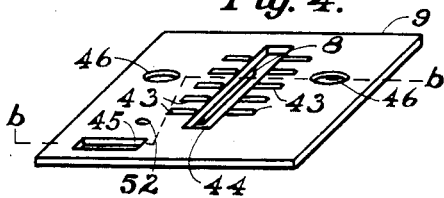
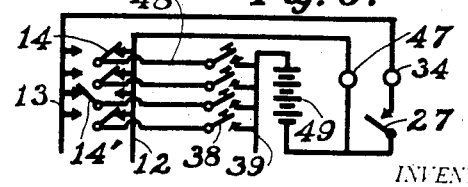
INVENTOR.
Joseph L. McGrath Patented Oct. 10, 1939

2,175,944

UNITED STATES PATENT OFFICE 2,175,944

AMUSEMENT DEVICE

Joseph L. McGrath, Wollaston, Mass.

Application December 31, 1936, Serial No. 118,617

10 Claims. (Cl. 35—9)

This invention relates to educational games and has for its object the provision of an incentive, other than a mere desire to learn to play a musical instrument, for going through suitable mental and physical exercises relating to instrument playing which are often boresome to the student. This purpose is accomplished by providing the game with a keyboard similar to a musical instrument keyboard, or to a section of such a keyboard, such as is used in conjunction with musical symbols which, by their relative locations in the player's field of vision, convey orders for operation of certain of the keys; a set of directive or directing indicators which are to be set up in various combinations successively to simultaneously suffice to direct the operator toward objectives providing entertainment and objectives providing educational exercises with respect to the keys; a timing element as a means for recording the promptness of the operator's response to directions, and as a means for making comparisons between the reactions of different persons or of the same persons at different times; and a set of signals operating automatically in cooperation with the keys and the directive indicators to inform the operator as to whether his reactions accomplish the purposes for which he strives. The required operations work toward the end that the operator shall become able to act without hesitation, mistakes or fumbling.

As an example, by using a set of keys representative of part of a piano keyboard, and directive indicators which are made to appear in positions corelative to those of written musical notes, a person may learn to read musical note positions and to readily operate such piano keys as are represented in the provided key set. By having automatic signals indicating whether he is quick or slow at these operations, and automatic signals to show whether he presses the key wanted, or another, elements of competition are introduced which make a game of interest whether or not he is immediately interested in the piano, to a person operating by himself or with others. Keyboard arrangements representative of the accordion, saxophone, and numerous other instruments may be adapted similarly.

The invention consists of certain novel features of construction and arrangement of parts which will be readily understood by reference to the description of the drawing and to the claims to be hereinafter given.

For the purpose of illustrating the invention, one preferred form thereof is illustrated in the drawing, this form having been found to give satisfactory and reliable results, although it is to be understood that the various instrumentalities of which the invention consists can be variously arranged and organized and that the invention is not limited to the precise arrangement and organization of these instrumentalities as herein shown and described, except as required by the scope of the appended claims.

Of the drawing:

Fig. 1 represents a top view of a device embodying the principles of the present invention; the cover for the container of the mechanism above line $a$, $a$, and parts thereon being omitted.

Fig. 2 represents a front view of the mechanism from line $a$, $a$, on Fig. 1 and a sectional view of the cover on line $b$, $b$, on Fig. 4.

Fig. 3 represents a view of the keyboard on the line $c$, $c$, on Fig. 1.

Fig. 4 represents a view of the cover of the mechanism above line $a$, $a$, on Fig. 1.

Fig. 5 is a diagram of the electrical circuit used with the instrumentalities of Fig. 1.

Similar characters indicate like parts throughout the several figures of the drawing.

In the drawing, 1 is a cylinder having an axle 2 at its axis carried by supports 3 so that the cylinder may be spun easily in the supports and will balance at any point of angular rotation. Duplicate directive indicators 7, consisting of colored wafers, are fixed to the cylinder with their surfaces flush with the surface of the cylinder. Written music consists of a series of notes representing tones, but a number of notes identical in appearance may represent as many different tones by reason of being at different levels on the sheet. To aid the reader in determining the level upon which a note rests, we normally draw five lines, called a staff, as guides, or range marks, though there is no reason why a different system of guides could not be used. In piano playing the notes direct the reader to strike relative keys, and indicators 7 are directive in the same sense. Any directive indicator makes its appearance to the player in a position calculated to represent a certain key, and only part of the total number of keys is represented by visible indicators at any moment. Any directive indicator visible to the player calls for the pressing of a certain key, while those not in view represent keys to be left untouched. The relation of the directive indicators and the keys may be presented in a set of directions, or the user may learn the relations by trial where a single key is to be operated, since the correct key alone will show correctly on the incorporated signaling system. Nubs 6 are affixed to the cylinder and are so placed as to hold a contactor spring 14 against contact bar 13 when its related directive indicator appears in window 44 and the setting becomes playable. The cylinder is stationary during a playable setting.

Rocker block 15 of electrical insulating material is a rocker in that it has a back and forth tipping action with the center of shaft 16 of electrical insulating material as the axis of this motion. A plurality of duplicate spring contactors 14 are fixed to the rocker block with their free ends between contactor bars 12 and 13; the bars being fixed to blocks 17. The rocking action of rocker block 15 is provided to shift these contactors away from physical contact with nubs 6 during rotation for resetting of the cylinder. Only a small rock is required; bending of the contactor springs after they strike bar 13 allows the required result. Blocks 17 are drilled to act as bearings for shaft 16. In the position of the rocker block shown in Fig. 2 the contactors 14 normally make circuit to contactor bar 12.

Contactors 14 are in line of rotation of nubs 6 on the cylinder so that at certain positions of the cylinder the contactors are held away from bar 12 to the position shown by contactor 14' where circuit is made through contactor bar 13.

A plurality of keys 35 representing a section of a piano keyboard and drilled to rock on rod 36 fixed in blocks 37 are normally in the position indicated in Fig. 3. Spring contactors 38 press against the bottoms of the keys, and stop 41 in the slots 42 limits the key movement.

Individual contactors 14 are in circuit to individual contactors 38 through conductors 48 shown in Figs. 1 and 5. Manual pressure on any key brings its contactor 38 into connection with contactor bar 39. Bar 39 connects to one side of the power supply 49, represented in Fig. 5.

A lamp 47 is used to indicate a completed circuit by way of contact bar 12. Indication from lamp 47 signals operation of keys which are not represented by directive indicators in view; of keys which should have been untouched during a playable setting.

Lamp 34 lights to indicate a completed circuit by way of contact bar 13. Switch 27 has a blade of flat spring material fixed at one end, and, at the other end, working against a contact point, shown schematically in Figs. 1, 2, and 5, which holds the circuit closed until plunger 26 of time-delay device 25 strikes and bends the blade to open the circuit. Operation of the keyboard in the manner called for by the visible directive indicators operates lamp 34. Lamp supports have been omitted from the drawing for the sake of clarity.

Cover 9 has a window 44 through which directive indicators 7 are viewed. The appearance of these indicators in this window is coincident with the positioning of nubs to hold corresponding spring contactors 14 against contactor bar 13 as represented by 14' in Fig. 2. Guide device range markers 43, consisting of narrow strips of material of triangular cross section which the player may place individually as he wishes on the cover, Fig. 4, and fixed marker strips 40 on the keys in positions corresponding to positions of black piano keys, Figs. 1 and 3, are for reference in determining the relative positions of directive indicators appearing at window, and in finding keys related to these directive indicators, respectively.

A directive indicator which represents a key at the left appears in the window at a point nearer the player than one representing a key farther toward the right.

Actuating bar 20 slides in the fixed blocks 21, from the position shown, toward stop 33 to reset the several mechanisms. Thumb-piece 30, by means of which the player moves this bar, extends up through slot 45 in cover 9. Spring 29 returns the actuating bar, after the latter has been moved by the player, to the limit imposed by pin 10 when it rests against star-wheel 11 teeth.

Pin 31 on the actuating bar engages pin 32 of time-delay device 25 to draw in plunger 26 and allow switch 27 to close. Thumb screw 51 adjusts the operating delay of device 25 by adjusting the air intake opening to a bellows which is normally expanded due to a contained spiral spring. Pin 32 and plunger 26 are attached to the solid, movable end of the bellows.

Pin 18 on the actuating bar engages pin 19 set in rocker-block 15 to tip the latter into the position maintained during key operation, shown in Fig. 2. As pin 18 is moved away from the pin 19 position shown, spring 28 tips the rocker-block to where contactors 14 clear nubs 6, and this position is held during rotation of the cylinder.

Star-wheel 11 is fastened to the turned-down end of cylinder 1. Pin 10 is so formed and set on the actuating bar that its movement is radial to the star-wheel. Spring finger 22 is fastened to pin 10. As bar 20 slides toward stop 33, from the position shown, stop 10 disengages from and the spring-finger engages with the star-wheel and the cylinder is turned. The spring-finger is carried to a point where the teeth of the star-wheel do not touch it while the cylinder continues to rotate, due to inertia.

As the actuating bar is returned by spring 29, the spring-finger is so adapted as to turn the star-wheel slightly in case the latter stopped with a tooth point in the line of motion of stop 10; stop 10 is pulled into a V of the star-wheel to set and hold the cylinder to position; and spring-finger 22 slides over a tooth to the position shown in Fig. 2.

As the actuating bar 20 is moved toward stop 33, it carries pin 23, and allows spring 24 to pull blind 4, mounted to rock on studs 5, against stop 8 fixed to the under side of cover 9. The view of directive indicators through window 44 is thus cut off during the time of rotation of the cylinder.

Windows 46 in cover 9 are for viewing the lamps 47 and 34.

In the operation of the device, the operator sets adjustment screw 51 of the time-delay device, thereby fixing the period of time, following the opening of the blind to reveal a new setting of directive indicators, within which he may expect to achieve the goal of operating lamp 34 without operation of lamp 47. He next sets range markers 43 on the cover. These may be set to correspond to the five lines of the musical staff to give a conventionally educational aspect to the game, or in some other relation from which the location of the directive indicators may be measured. The markers may be set to give considerable help to those players new at the game, or to give but little help by being more or less removed from contiguity with the window. By making the range markers in forms to represent narrow battleships, making the directive indicators represent submarines, and making the keys represent gun controls, child interest may be heightened, and, although no thought of music be put into his mind during his play, his individual acts in translating visual impressions into physical motions will be those he may later use in series to play a piano selection, and with which he will have attained an advantageous degree of familiarity.

Now by moving thumb-piece 30 quickly, the player brings actuating bar 20 against stop 33 to hide the view through window 44, close and thereby expel the air from the bellows of the time-delay device, and rotate the cylinder. Since the cylinder turns, after finger 22 disengages from the star-wheel, to an extent depending upon the force applied through the actuating bar and upon the weight of it, the angle of rotation is indeterminate and the new setting is secret. Rotation may be a fraction of a turn or up to a number of turns.

The player releases the thumb-piece and spring 29 moves the actuating bar to start the time-delay device by releasing the pressure on the spring-opening bellows, fix the position of the cylinder, and open blind 4. The keys are up and lamps 34 and 47 are dark.

Upon seeing one or more of the directive indicators in window 44, the player attempts to determine the position of each, by reference to range markers or any other mark or thing in view. The player is required to identify directive indicators from their relative positions rather than from color, shape, or other physical make-up. Having decided upon the positions, he next attempts to interpret their directive meanings, and select and press the keys indicated, with the object of having lamp 34 light up. He attempts to avoid lighting lamp 47 by avoiding the closing of keys not represented by those directive indicators showing in window 44; one object of the game. Indicator lamp 34 is open circuited in every case after the time limit expires, that is, after the bellows has sucked in enough air to allow it to expand and expel plunger 26 to open switch 27. Lamp 47 is not thus limited and so allows a false key operation to register at any time. This serves as a means for checking the power supply also.

Competitive scoring is made according to (1) success in lighting lamp 34, (2) success in avoiding operation of lamp 47, and (3) success in using a short time limit, and handicaps for unevenly matched competitors are available in the settings of range markers and time-delay means, giving a wide marking range.

It is believed that the operation and many educationally instructive forms of the invention will be apparent without further description.

Having thus described my invention, I claim:

1. A device of the class described comprising a plurality of indicators; means to support said indicators in positions where they assume directive meanings assigned to these positions; guide devices adjacent to said means of support to aid in determination of indicator positions; means to rearrange said indicators successively to vary the directive meanings; a keyboard to be manually and selectively operated, in conformity with the operator's interpretation of directions of the indicators beforementioned; signalling means adapted to indicate whether or not any keyboard operation, as performed, was in conformity with the meaning of the indicator positions; and means to set the signalling means, previous to operation of the keyboard, to signal in conformity with the setting of the directive indicators.

2. A device of the class described comprising a plurality of indicators; means to support said indicators in visible positions; guide devices adjacent to said means of support and acting as operator references in determination of indicator locations; means to reorganize said indicators to any one of various relations successively available on said means of support; means to obstruct the operator's view of said indicators while they are in motion; a plurality of keys for manual and selective operation of a signalling means; signalling means adapted to indicate operation of said keys and to show to which of alternative coactions the keys were set; and automatic means to set the signalling means, prior to key operation, to alternative coactions whereby the subsequent signaling agrees with the purpose for which said signaling means is adapted.

3. A device of the class described comprising a plurality of indicators positioned adjacent to and in visible relation to guide devices to provide directive meanings; guide devices; means to rearrange said indicators with relation to said guide devices; means to obstruct the view to said indicators during resetting operations; a plurality of keys for manual and selective operation of signalling means; signalling means adapted to indicate operation of any key in alternative coactions; means to automatically indicate the termination of a period of time for operation of keys after said keys are indicated to be operated; and means to vary the action of last named means to measure a suitable period of time.

4. A device of the class described comprising a plurality of indicators; guide means; means to support said indicators and guide means in visible patterns representing directive meanings; means to indeterminately shift said indicators to positions within or without a field of visibility; a plurality of keys for manual and selective operation; signalling means adapted to indicate operation of said keys; means to automatically shift the connections between said keys and the signalling means, as the indicators enter or leave positions where they are to be observed, whereby the signaling means is set to automatically check any operator interpretation of a directive indicator pattern; means to automatically indicate whether the manual operation of the keyboard occurs within or outside of a set period of time; and a blind adapted, acting in cooperation with the indicator shifting means, to automatically hide the directive indicators while they are being reset.

5. A device of the class described comprising a plurality of indicators positioned adjacent to and in visible relation to guide means to provide visual directive meanings; guide means adapted to aid in determination of directive indicator meanings; means to indeterminately shift said directive indicators into new meaningful positions; a plurality of keys for manual and selective operation; signalling means adapted to indicate operation of said keys and to show to which of alternative coactions the keys were set; means to automatically indicate the termination of preselected time periods allowed for operation of the keys; means to automatically shift the connections between keys and signalling means to present automatic checking coactions in conformity with settings of the directive indicators; a blind adapted to automatically hide the directive indicators while they are shifted; and means to simultaneously open the blind and start the time indicator mechanism.

6. A device of the class described comprising a plurality of indicators distributed in definite relation to each other on a cylinder so as to incorporate directive meanings in their space relation on predetermined areas; a mask having a window for revealing said indicators in the areas of directive meanings; a range finder composed of elements movable with respect to each other and with respect to said window for visual reference in determining the position of indicators appearing in different parts of the window; a cylinder carrying predetermined surface irregularities set in fixed relation to the settings of the first named indicators; means to rotate said cylinders through indeterminate angles; a plurality of electrical contact arms operating with relation to the first named indicators and arranged to make contact with either of two sets of interconnected contact points under guidance of the surface irregularities of the cylinder beforementioned; two sets of interconnected contact points, one termed primary, the other termed secondary for identity herein, to cooperate with said contact arms; a plurality of electrical keys; electrical connections from each of said contact arms to one side of relative keys and from the opposite side of each key to one terminal of a source of electricity; a source of electrical power; an electrically operated signal device with one terminal connected to the second terminal of the power source and the other connected to one of the beforesaid sets of interconnected contact points, said set being that termed secondary, and said signal device operating to show key operations in conformity with directions of first named indicators; a second electrically operated signal device with one terminal connected to the second terminal of the power source, through a switch, and the other to the beforementioned set of interconnected contact points termed primary and operating to show key operations not in conformity with directions of first named indicators; a switch to open-circuit said second signal device; a time-delay device operating to open and close said switch, thereby providing limited periods during which the first said signal device may be operated; and means to vary the length of the periods last mentioned.

7. In combination, the device claimed in claim 6, and a movable blind to cover the mask window during movements of the directive indicators.

8. In combination, the device claimed in claim 6; a movable blind to cover the mask window during movements of the directive indicators, and means to automatically move the blind to uncover directive indicator settings as a period of play begins.

9. A mechanism for turning a carrier of directive indicators an indeterminate number of angular degrees comprising a multiple toothed star-wheel mounted on an axle set in free bearings and positively coupled to said carrier; a reciprocative arm at substantially right angles to the axle; a pin of small diameter, as compared to the pitch of the star-wheel, carried on said arm and adapted to be carried thereby into engagement with the star-wheel; a spring finger mounted on said arm with its free extremity substantially parallel with the axle and in position to engage the star-wheel in the region 90 degrees from the line of travel of said pin, and at a point where, during travel of this pin toward the axle, it will turn the star-wheel points out of line with the oncoming pin, and adapted to give way to any turning force exerted on the star-wheel by this pin; means to automatically carry the arm to the limit where the pin bears substantially at the bottom of a V of the star-wheel; means to carry the arm to an opposite limit to that last mentioned where neither pin nor finger spring engage the star-wheel while the latter is turning under influence of energy given to it by a rapid movement of the finger carrying arm.

10. In a device of the class described, a reset mechanism comprising a reciprocative bar; guide blocks for the reciprocative bar; a base on which the guide blocks are fixed; a helical spring with opposite ends connected to the bar and the base; means for moving the bar to extend the spring; a stop to limit the travel of the bar in the extended spring mode; a pin carried by the bar to bear in V's of a star-wheel and thus stop the bar in the closed spring position; a spring finger mounted on the bar and adapted to engage with and turn the star-wheel; a pin carried by the bar to engage and open a spring-closed blind as the reciprocative bar approaches close to its normal position; a pin carried by the bar to engage and tip a contact shifting rocker block into its normal position as the bar approaches close to its normal position; and a pin carried by the reciprocative bar to engage a timer setting arm as the bar is moved away from its normal position.

JOSEPH L. McGRATH.